United States Patent [19]

Forch

[11] 4,428,587
[45] Jan. 31, 1984

[54] SEAL RING WITH CHANNEL FOR RADIALLY ACCELERATING MEDIUM TO BE SEALED

[75] Inventor: Hans Forch, Birkenau, Fed. Rep. of Germany

[73] Assignee: Firma Carl Freudenberg, Weinheim, Fed. Rep. of Germany

[21] Appl. No.: 493,391

[22] Filed: May 10, 1983

[51] Int. Cl.$^3$ .................... F16J 15/42; F16J 15/32
[52] U.S. Cl. .............................. 277/25; 277/133; 277/153
[58] Field of Search ............... 277/13, 14 V, 14 R, 277/24, 25, 27, 59, 133, 134, 135, 152, 153

[56] References Cited

U.S. PATENT DOCUMENTS

| | | | |
|---|---|---|---|
| 3,256,027 | 6/1966 | Chapel | 277/25 |
| 3,627,390 | 12/1971 | Irwin | 277/25 X |
| 3,938,813 | 2/1976 | Forch | 277/152 |
| 4,000,930 | 1/1977 | Poncet et al. | 277/135 X |

FOREIGN PATENT DOCUMENTS 12133  6/1980  European Pat. Off. .............. 277/25

*Primary Examiner*—Robert S. Ward, Jr.
*Attorney, Agent, or Firm*—Felfe & Lynch

[57] ABSTRACT

A seal ring seals a shaft in a housing dynamically and statically. The dynamic seal function is provided by a porous compact which rotates with the shaft to pump liquid media centrifugally back into the sealed space and generally radial, inward channels which similarly pump gases which penetrate the compact to the channels. An annular gas impingement surface is spaced from the discharge ends of the channels at an obtuse angle to entrain the pumped gases back into the sealed space. The static seal centrifugally opens upon rotation.

20 Claims, 6 Drawing Figures

SEAL RING WITH CHANNEL FOR RADIALLY ACCELERATING MEDIUM TO BE SEALED

BACKGROUND OF THE INVENTION

The invention relates to a seal ring for sealing around a shaft and, more particularly, a combined static and dynamic seal ring.

Seal rings generally of the type to be described are disclosed in European patent application No. 12133. They are intended for sealing an air-liquid mixture and, particularly, for sealing an oil mist of the type frequently encountered in the crankcases of internal-combustion engines.

The principle of operation of seal rings of this type is based on a phase separation of the medium to be sealed in a compact which rotates with the shaft and is porous in the radial and axial directions. The medium to be sealed flows into the pore system of the compact and is rotationally accelerated radially. The forces which are exerted on the liquid constituents in this process are considerably greater than those which are exerted on the gaseous constituents because of the greater mass per unit volume of the liquids. As a result, the liquid constituents are immediately thrown radially and thus pumped back into the sealed space, while the gaseous constituents are able to flow nearly unhindered through the compact in the axial direction. Then they are likewise radially deflected and returned to the sealed space. The pressure level in the latter is stable under operating conditions. Liquid constituents are able to traverse the sealing ring only when the speed of rotation is reduced, and leakage is prevented in that case by a lip seal ring which then becomes effective.

A requirement for proper operation of the above seal is direct contact between the porous compact and an annular sealing surface which projects inwardly from an outer ring thereabout. Since the compact rotates under operating conditions, frictional forces of this contact must be overcome. This requires additional energy consumption and results in wear so that the seal ring described has only a limited service life.

U.S. Pat. No. 3,256,027 discloses a seal ring of the type in which a lip seal lifts off in operation. It is preceded, in the direction of the medium to be sealed, by a contact-free centrifugal seal. The later consists of an impeller which rotates with the shaft and an impingement surface which externally surrounds the impeller and extends parallel to the shaft axis. The impelled liquid striking the impingement surface is thus deflected, not only in the direction of the sealed space, but also in the other axial direction. This results in leakage. No mention is made of the sealing of a mixture of a liquid and a gas.

SUMMARY OF THE INVENTION

An object of the invention is therefore to provide a seal ring which is free of surfaces which, under operating conditions, are in wiping contact with each other and which has good sealing action for a liquid-gas mixture.

In accordance with the invention, this object is accomplished by forming enclosed, radial channels on the inner radial side of a porous compact ring rotated with the shaft to be sealed and, disposed at a small radial distance from their discharge openings at the periphery of the compact, an annular impingement surface on a non-rotating outer ring that is at an initial obtuse angle to the channels and open toward the sealed space at the other side of the compact. This contrasts with U.S. Pat. No. 3,256,027. Also, the compact is not in direct contact with the outer ring. Frictional forces therefore cannot act on it at any time.

Friction is generated, but only during the starting phase, by contact between a lip sealing ring extending from the inner, compact ring which rotates with the shaft to an associated sealing surface on the outer ring. These two functional components (the porous compact and lip sealing ring) are essential since, with a shaft stationary or at nominal, low rotational speeds, the dynamic porous compact seal is not effective. It becomes effective only at higher operating speeds at which the lip sealing ring centrifugally separates from the sealing surface. As the nominal rotational speeds are usually traversed rapidly as engines and turbines are started, however, the wear to which the sealing lip is subjected under these conditions is minimal.

The porosity of the compact, moreover, is preferably such that a gas-liquid mixture is separated into its gas and liquid phases in the compact. The liquid is returned to the sealed space directly from the compact. The gas which penetrates to the channels is there accelerated to a high velocity because the flow resistance of the channels is less than that of the compact. The gas exiting from the discharge openings of the channels then follows the annular impingement surface with sufficient velocity to force leakage liquid seeping along said surface back into the sealed space. The effect is augmented by a large number of such channels distributed around the periphery of the compact. Liquid is therefore unable to traverse the impingement surface in the axial direction and thus there can be no leakage under operating conditions.

The compact may consist of the materials known from European patent application No. 12133, for example: sintered compacts of regular or irregularly shaped plastic or metal particles. It may also consist of a plurality of circular perforated disks, optionally embossed, which are mounted on the inner ring, spaced apart, and which may be made of a plastic or metal. Synthetic open-pore rigid foams also may be used, as may fibrous materials or composites of several of the materials named. Thus, there is considerable freedom of choice and opportunity for adaptation to a given application. With decreasing droplet size of the liquid in the sealed-in medium, it becomes necessary to reduce the pore radius and, possibly, to increase the cross-sectional area of the compact in the radial and/or axial direction. The free cross-sectional area of the channels should preferably be from about 8 to about 16 times the free cross-sectional area of an average-size pore passage.

The obtuse angle between the channels and the profile of the impingement surface preferably ranges from about 100° to about 170°. Advantageous within this range are values between 120° and 150°.

The axial angle which the channels make with the axis of rotation may be smaller than 90°. A value of about 90° will allow for considerable radial shaft excursions, such as those which may occur in starting internal-combustion engines, for example, without appreciably affecting operation. Values under 90°, on the other hand, will permit the radius of the compact to be reduced. However, the respective options are limited by the need to use the oblique impingement surface that is open in the directions of the sealed space and advantageously conically enlarges.

Viewed from the front, that is radially, the channels may be involute or volute, much like a pump impeller. The latter will assure maximum gas velocity, which is conducive to effective sealing.

The channels also may be separated from the compact by a liquid-impermeable base plate which is provided with radially inward overflow or entry channels, that is in proximity to the inner periphery. With this design, the gas stream is conducted into the channels in proximity to the inner periphery and is accelerated therein to high velocity without interference from crosscurrents or the rough walls of the compact. In such a design, base and cover plates are advantageously produced as molded parts incorporating finished, optimized-form radial channels and overflow channels with optimally matched cross-sectional areas.

The base plate may externally surround the compact with an annular extension that is conically enlarged in the direction of the sealed medium. The annular extension is likewise made of a liquid-impermeable material and serves for the enclosed return of the separated liquid and gas constituents to the sealed space. For this purpose, it may be advisable to have the extension extended, optionally annularly, past the face of the compact in the axial direction and to give it the shape of a splash ring.

The distance from the discharge ends of the channels to the impingement surface should be such that, under operating conditions, the gas streams emerging from the channels are deflected in the direction of the sealed space, preferably without turbulence or backing up. This requirement will be adequately met by a design in which the ratio between the inlet and outlet cross-sectional areas ranges from 0.5 to 2.5, and preferably from 0.8 to 1.8. For this purpose, the inlet cross-sectional area is the total cross-sectional area of all the channels at their discharge ends, while the outlet cross-sectional area, simplified, is the product of the peripheral length of the impingement surface and its spacing from the discharge ends of the channels. When said ratio is lower, the lateral effect will be insufficient, whereas when the ratio is higher there will be a pronounced drop in flow velocity, and hence inadequate force on leakage liquid seeping along the impingement surface.

DESCRIPTION OF THE DRAWINGS

A few exemplary embodiments of the seal ring proposed in accordance with the invention are illustrated in the accompanying drawings, wherein.

DESCRIPTION OF THE EXEMPLARY EMBODIMENTS

Figure 1:
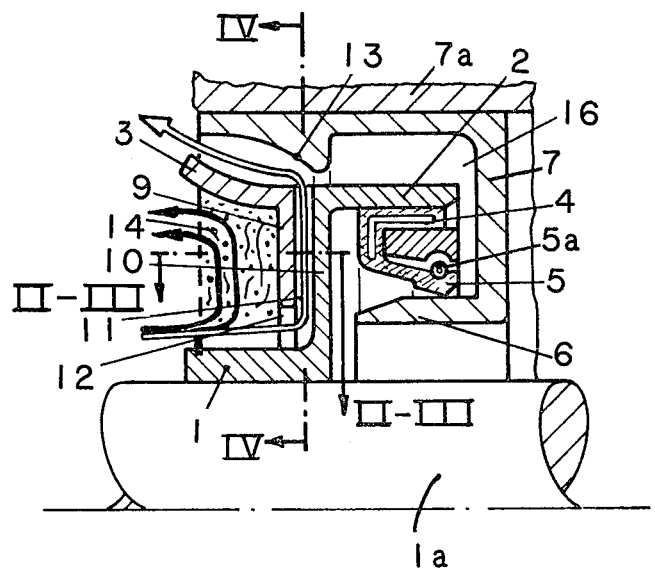
FIG. 1 is a semisectional view of a seal ring.

The seal ring of FIG. 1 consists of an inner ring 1 sealed about a shaft 1a for rotation therewith. The inner ring has a radial portion from which a radially outward extension 3 conically enlarges in the direction of the sealed medium and a crosspiece 2 extending parallel to the shaft axis in the other direction.

Forced into the annular crosspiece 2 is a conventional radial shaft seal ring 4 with sealing lip 5 urged by a garter spring 5a against a sealing surface of a shaft-parallel extension 6 of an outer ring 7 which extends radially to the housing 7a in which the seal ring seals the shaft. The radial shaft seal ring 4 is entrained by rotation of the shaft, inner ring 1, radial portion, and crosspiece 2 to subject its sealing lip 5 to centrifugal force against garter spring 5a which increases as the speed of rotation increases. When a nominal, low speed is reached, the contact shown between the sealing lip 5 and the extension 6 is broken so that there is no further wear.

The radial portion of the inner ring 1 is composed of a base plate 9 and a cover plate 10 which bound generally radial channels 11. The channels 11 are served by the overflow or entry channels 12 through base plate 9 near the inner ring 1.

The space enclosed by the interior portion of the inner ring 1, the base plate 9 and the extension 3 is filled with a sintered compact 14 of plastic granules which form a plurality of pores or passages intersecting one another in the radial and axial directions.

Under operating conditions, the medium to be sealed in, namely a mixture of a liquid and a gas, flows over the face of the sintered compact 14 which is directed toward the sealed space (left) and into the pore system of the sintered compact. There it is accelerated in the radial direction by the rotary motion of the shaft, inner ring, and compact and separated into its constituents by the differential action of the centrifugal force. The liquid constituents are thrown most in the radial direction and thus forced back into the sealed space immediately after the mixture has penetrated into the sintered compact. This is represented by the solid black arrows.

The gaseous constituents, however, may be forced through the pore system of the sintered compact and the overflow channels 12 to the channels 11 where they are accelerated to a high radial velocity. After leaving the radially open discharge ends of the channels 11, they strike an opposite impingement surface 13 of the outer ring 7 which is at an obtuse angle to the channels 11 and open in the direction of the sealed space. The gaseous constituents are thus deflected and returned to the sealed space separately from the liquid constituents. Their path is indicated by the arrow in outline form. The flow of the gaseous constituents prevents liquid seepage from traversing the path along the impingement surface in the axial direction to reach the side of the seal ring facing away from the pressure at crosspiece 2.

More specifically, the entire inner ring consists of the sintered compact 14 containing the pore system, the base plate 9, preformed with the peripheral conical extension 3 extending toward the pressure, and the cover plate 10, also preformed, which has a Z-shaped profile from the inner ring 1 per se to the peripheral crosspiece 2 extending away from the pressure. The inner ring 1 per se which bounds the inner periphery is sealingly secured to the shaft 1a by means of a press fit. Medium to be sealed, therefore, is unable to leave the sealed space at the left along the surface of the shaft or the impingement surface 13 of the outer ring to complete the seal of the shaft in housing 7a.

Figure 2:
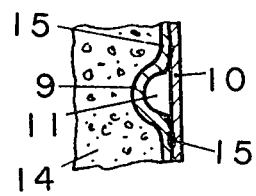
FIG. 2 is a sectional view of a portion of the seal ring of FIG. 1, taken along the line 2-3—2-3.
Figure 3:
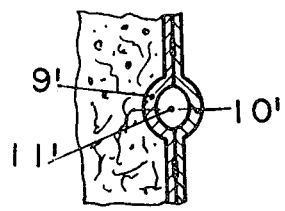
FIG. 3 shows another embodiment of the portion shown in FIG. 2.

The sintered compact 14 consists of polyamide particles of a diameter of 1.8 mm which are bonded to one another. The preformed base and cover plates 9, 10 are molded, also from polyamide. As shown in FIGS. 2 and 3, they are welded to each other along the lines 15 which extend perpendicularly to the plane of the drawing. FIG. 2 shows an embodiment in which only the base plate 9 is preformed with bulges (only one shown) for the channels 11. FIG. 3 shows an alternative embodiment in which the cover plate 10' is also preformed with additional bulges (only one shown) for enlarging the cross-sectional area of the channels 11' to improve the gas throughput. The ribs formed by the outside of the additional bulges in the cover plate 10' facing the radial shaft seal ring 4 also circulate gas in the space between the cover plate 10' and ring 4 for cooling its sealing lip 5 in the starting phase when it is frictionally heated by the contact with the extension 6, but the radial projection of the impingement surface 13 on the side facing the space 16 about crosspiece 2 and the higher pressure in the sealed space to the left blocks any flow of air from the lower-pressure intermediate space 16 into the sealed space even after the sealing lip has lifted off the extension 6. This is of considerable importance for avoiding an undesired accumulation of dust and other contaminates in the sealed space.

Figure 4:
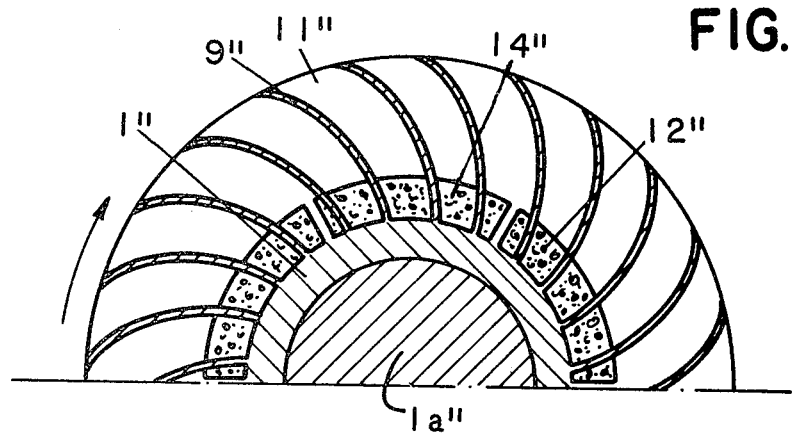
FIG. 4 is a view, partly in section, of another embodiment of a seal ring taken as though along the line 4—4 in FIG. 1.

In the seal ring of FIG. 1, the channels 11 extend radially. This simplifies production and provides favorable, symmetrical conditions for avoiding radial shaft oscillations. In the different seal ring embodiment in FIG. 4, the channels 11" are volute. The channels 11" therefore radially accelerate the gas to a particularly high velocity which improves the sealing action in cooperation with the impingement surface 13 (FIG. 1). This operation is dependent on the direction of rotation indicated by the arrow in FIG. 4. In contrast, the operation of the embodiment in FIG. 1 in which the channels extend radially is independent of the direction of rotation.

Figure 5:
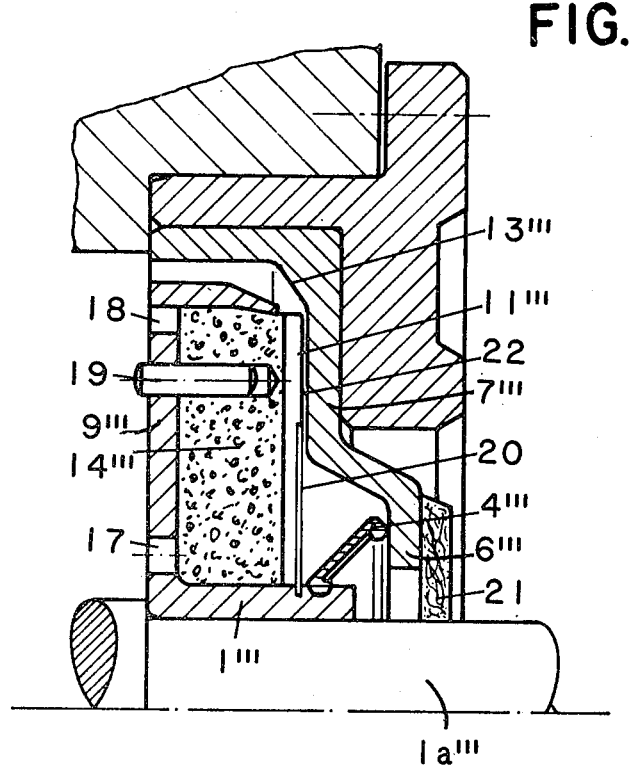
FIG. 5 is a semisectional view of a simplified embodiment.

Shown in FIG. 5 is an embodiment in which the open-pore compact 14''' is set into an annular groove in the inner ring 1''' behind (right) of the base plate 9''' relative to the ring-sealed space. The rotary motion is transmitted to the compact by pins 19; axial displacement is prevented by a liquid-impermeable disk 20 to maintain a space for channels 11''' between the compact and the outer ring 7'''. This compact 14''' consists of a synthetic-resin-bonded metallic-fiber mat.

Radially spaced passages 17, 18 (only one each being shown) penetrate the base plate 9''' to the compact 14'''. The dischage ends of the channels 11''', located in proximity to the outer periphery of the inner ring, are aligned with the impingement surface 13''' which is disposed at an obtuse angle of 145° to the channels.

In operation, the gas which issues from the channels 11''' forces leakage liquid seeping along the impingement surface 13''' back into the sealed space. The gas and liquid constituents enter the compact through the inner passages 17. The rotation centrifugally separates the liquid which is forced out through the outer passages 18 in the inner ring, again because of the gas pressure in the channels 11'''. The gas, however, passes through the compact to the channels 11''' where it is centrifugally accelerated to produce the pressure-flow described.

The seal just described, which acts dynamically upon rotation, is combined with a seal ring 4''', which acts statically and through a nominal speed of rotation, and a dust lip 21, which wipes against the surface of the shaft 1a''' to block dust. The principle of operation of the seal ring 4''' corresponds to that explained above, that is, it centrifugally lifts from the extension 6''' above a nominal rotational speed. To prevent still further the undesired drawing-in of dust from the environment (on the right) under operating conditions, it has been found advisable to keep the axial distance between the face of the compact 14''' which incorporates the channels 11''' and the opposite portion 22 of the outer ring to a minimum and, optionally, to make the outside diameter of the disk 20 somewhat larger then the inside diameter of the portion 22 where it bends to the extension 6'''.

Figure 6:
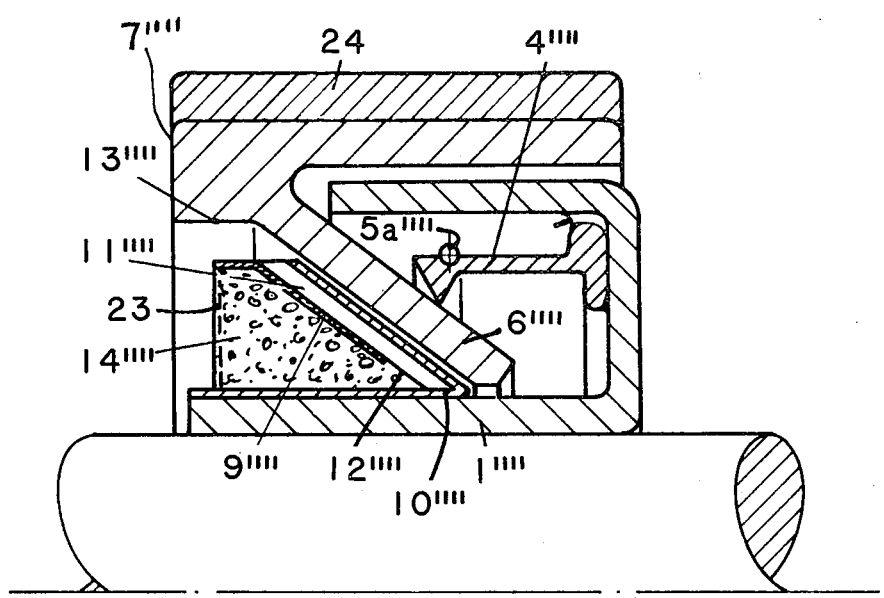
FIG. 6 is a semisectional view of a further simplified embodiment.

FIG. 6 shows an embodiment in which the inner ring 1'''' and the outer ring 7'''' form a unit which can be installed and removed as a unit without requiring special adjustments. The inner ring 1'''' is U-shaped, opening in the direction of the sealed space (left). An extension 6'''' of the outer ring 7'''' inwardly inclines at an obtuse angle into the U-shaped opening. The seal ring 4'''' bears on the outer surface of the extension 6'''' in dependence on the speed of rotation from inside the U of the inner ring. The cover plate 10'''' has a V-section of about 60° vertex angle. One leg mounts on the shaft-engaging part of the inner ring and the other parallels the extension 6''''. The base plate 9'''' forming the channels 11'''' and entry passages 12'''' (only one each shown) is welded inside the V and the compact 14'''' fills the rest of the V. The compact 14'''' is formed of sintered polytetrafluoroethelene particles having an average particle diameter of 1.5 mm. The channels 11'''' have a free cross-sectional area of 4.8 mm². An extension of the channels 11'''' makes an angle of about 143° with the impingement surface 13'''' of the outer ring. The face directed toward the sealed medium is covered by a perforated metal sheet 23 whose solid surface amounts to 62% and which is soldered to the cover and base plates 10'''', 9''''. Finally, the outer ring is externally provided with a layer 24 of soft, resilient rubber. Once it has been forced into the fore of a machine part, it will therefore spring back sufficiently to provide automatically the desired and necessary axial play between the two parts as well as mounting the entire seal ring unit.

It will be understood that the specification and examples are illustrative but not limitative of the present invention and that other embodiments within the spirit and scope of the invention will suggest themselves to those skilled in the art.

What is claimed is:

1. In a seal ring having an inner ring for sealing to a shaft and rotation therewith, a porous compact ring portion of the inner ring, an outer ring for non-rotating, sealed connection to a housing in which the shaft is to be sealed, and a radial shaft seal ring extending from the inner ring for rotation therewith to a lip which sealing engages the outer ring below a nominal speed of rotation and centrifugally separates therefrom at higher rotational speeds, the improvement comprising:

means in the inner ring forming at least one generally radial channel axially inward of the compact and axially closed therebeyond and extending to an open, radially-outer discharge end thereof for radially accelerating medium to be sealed which penetrates the compact to the channel upon rotation of the inner ring; and an annular impingement surface means on the outer ring spaced a small distance from the discharge end of the channel at an obtuse angle to the channel and extending therefrom generally axially about the compact ring for directing the radially accelerated medium from the channel therealong.

2. A seal ring as in claim 1, wherein the cross-sectional area of the channel is from 8 to 16 times the free cross-sectional area of an average-size pore passage in the compact.

3. A seal ring as in claim 1, wherein the obtuse angle of the annular impingement surface to the channel is in the range of from about 100° to about 170°.

4. A seal ring as in claim 2, wherein the obtuse angle of the annular impingement surface to the channel is in the range of from about 100° to about 170°.

5. A seal ring as in claim 1, wherein the obtuse angle of the annular impingement surface to the channel is in the range of from about 120° to about 150°.

6. A seal ring as in claim 1, wherein the channel makes an angle of about 90° with the axis of rotation of the inner ring.

7. A seal ring as in claim 1, wherein the channel is one of radially volute and involute.

8. A seal ring as in claim 2, wherein the channel is one of radially volute and involute.

9. A seal ring as in claim 3, wherein the channel is one of radially volute and involute.

10. A seal ring as in claim 1, and further comprising a base plate between the compact and the means forming the at least one channel which is at least liquid impermeable and has a overflow channel through a radially inward portion thereof to the aforesaid channel.

11. A seal ring as in claim 2, and further comprising a base plate between the compact and the means forming the at least one channel which is at least liquid impermeable and has a overflow channel through a radially inward portion thereof to the aforesaid channel.

12. A seal ring as in claim 3, and further comprising a base plate between the compact and the means forming the at least one channel which is at least liquid impermeable and has a overflow channel through a radially inward portion thereof to the aforesaid channel.

13. A seal ring as in claim 7, and further comprising a base plate between the compact and the means forming the at least one channel which is at least liquid impermeable and has a overflow channel through a radially inward portion thereof to the aforesaid channel.

14. A seal ring as in claim 10, wherein a radially enlarging extension of the base plate generally axially encloses the compact.

15. A seal ring as in claim 11, wherein a radially enlarging extension of the base plate generally axially encloses the compact.

16. A seal ring as in claim 12, wherein a radially enlarging extension of the base plate generally axially encloses the compact.

17. A seal ring as in claim 13, wherein the radially enlarged end of the extension of the base plate projects axially beyond the compact in the form of a splash ring.

18. A seal ring as in claim 1, wherein the ratio between the total cross-sectional area of all of the at least one channels to the product of the peripheral length of the impingement surface times its spacing from the discharge end of the at least one channel is in the range of from about 0.5 to 2.5.

19. A seal ring as in claim 3, wherein the ratio between the total cross-sectional area of all of the at least one channels to the product of the peripheral length of the impingement surface times its spacing from the discharge end of the at least one channel is in the range of from about 0.5 to 2.5.

20. A seal ring as in claim 14, wherein the ratio between the total cross-sectional area of all of the at least one channels to the product of the peripheral length of the impingement surface times its spacing from the discharge end of the at least one channel is in the range of from about 0.5 to 2.5.

* * * * *